(12) United States Patent
Ueda et al.

(10) Patent No.: US 8,392,346 B2
(45) Date of Patent: Mar. 5, 2013

(54) REINFORCEMENT LEARNING SYSTEM

(75) Inventors: Yugo Ueda, Wako (JP); Tadaaki Hasegawa, Wako (JP); Soshi Iba, Wako (JP); Koji Akatsuka, Wako (JP); Norikazu Sugimoto, Kyoto (JP)

(73) Assignees: Honda Motor Co., Ltd., Tokyo (JP); Advanced Telecommunications Research Institute International, Kyoto (JP)

( * ) Notice: Subject to any disclaimer, the term of this patent is extended or adjusted under 35 U.S.C. 154(b) by 645 days.

(21) Appl. No.: 12/610,709

(22) Filed: Nov. 2, 2009

(65) Prior Publication Data
US 2010/0114807 A1 May 6, 2010

(30) Foreign Application Priority Data

Nov. 4, 2008 (JP) ................................. 2008-283677
Jul. 27, 2009 (JP) ................................. 2009-174585

(51) Int. Cl.
*G06F 15/18* (2006.01)
*G06N 3/08* (2006.01)
(52) U.S. Cl. ........................................................ 706/25
(58) Field of Classification Search ..................... 706/25
See application file for complete search history.

(56) References Cited

FOREIGN PATENT DOCUMENTS
JP 2005-078516 3/2005

OTHER PUBLICATIONS

I.A. Basheer and M. Hajmeer, "Artificial Neural Networks: Fundamentals, Computing, Design, and Application", J. Microbiological Methods 43, pp. 3-31, 2000.*
L.K. Hansen and P. Salamon, "Neural Network Ensembles", Pattern Analysis and Mach. Intelligence, IEEE Trans. on, vol. 12, No. 10, Oct. 1990, pp. 993-1001.*

* cited by examiner

*Primary Examiner* — Kakali Chaki
*Assistant Examiner* — Vincent Gonzales
(74) *Attorney, Agent, or Firm* — Rankin, Hill & Clark LLP (57) ABSTRACT

A reinforcement learning system (1) of the present invention utilizes a value of a first value gradient function ($dV_1/dt$) in the learning performed by a second learning device (122), namely in evaluating a second reward ($r_2(t)$). The first value gradient function ($dV_1/dt$) is a temporal differential of a first value function ($V_1$) which is defined according to a first reward ($r_1(t)$) obtained from an environment and is served as a learning result given by a first learning device (121). An action policy which should be taken by a robot (R) to execute a task is determined based on the second reward ($r_2(t)$).

12 Claims, 7 Drawing Sheets

REINFORCEMENT LEARNING SYSTEM

BACKGROUND OF THE INVENTION

1. Field of the Invention

The present invention relates to a reinforcement learning system for making an agent learn an action policy for executing a task.

2. Description of the Related Art

In an attempt to reduce a learning time for obtaining a behavior suitable for a task, there has been disclosed an art (refer to Japanese Patent Laid-open No. 2005-078516) which determines action policies for an agent from learning results obtained by a plurality of learning devices based on the surrounding state and selects an action policy from the plural action policies based on the learning performance of each learning device.

According to the conventional art, only the learning result from a single learning device is utilized, thereby, it is difficult for the agent to execute such a task that involves complicated actions which may be achieved by making full use of the learning results from the other learning devices.

SUMMARY OF THE INVENTION

The present invention has been accomplished in view of the aforementioned problems, and it is therefore an object of the present invention to provide a reinforcement learning system capable of making an agent learn an action policy for executing a task involving complicated actions.

To attain an object described above, the reinforcement learning system for making an agent learn an action policy for executing a task according to the present invention comprises: an environment recognizing device configured to recognize a first to an nth ($n \geq 2$) state variables representing an environment; n numbers of jth ($j=1, 2, \ldots n$) learning devices configured to calculate a jth reward based on a jth state variable recognized by the environment recognizing device, calculate a jth value according to a jth value function based on the jth state variable, calculate a jth error based on the jth reward and the jth value, and properly modify respectively the jth value function based on the jth error; and an action policy determining device configured to determine an action policy the agent should take based on a part or the entire part of the jth reward calculated by the n numbers of the jth learning device, wherein an (i+1)th ($i=1, 2, \ldots n-1$) learning device is configured to calculate an (i+1)th reward based on a value of an ith reward function related to an ith state variable and a value of an ith value gradient function which is a temporal differential of an ith value function.

According to the reinforcement learning system of the present invention, the value of the ith value gradient function can be utilized in the learning performed by the (i+1)th ($i=1, 2, \ldots, n-1$) learning device. Herein, the ith value gradient function is a temporal differential of the ith value function which is defined according to the ith reward obtained from the environment and is also a learning result obtained by the ith learning device. Note that the ith state variable is a conception including scalar and vector.

According thereto, in the learning performed by the nth learning device, the learning result performed by the (n−1)th learning device can be utilized directly and the learning results by the learning devices prior to the (n−2)th learning devices can be utilized indirectly. In other words, all the learning policies represented by the first to the nth reward functions for the first to the nth learning devices, respectively, are expressed by the nth value function which is the learning result by the nth learning device. Consequently, an action policy which should be taken by the agent can be determined based on a part or the entire part of the first to the nth rewards.

Therefore, an action policy defined according to the variation behaviors of a plurality of state variables can be learned by the agent to execute a task involving complicated actions.

It is acceptable to configure the (i+1)th learning device to evaluate the (i+1)th reward lower as the ith value gradient function goes greater toward a negative side.

According to the reinforcement learning system with the mentioned configuration, in a case where the values of the ith value function decrease in a time series, in other words, when the environment defined according to the action policy of the agent is contradicted to the learning policy of the ith learning device, the (i+1)th reward calculated by the (i+1)th learning device is evaluated lower.

Accordingly, an action policy contradicted to the learning policy of the ith learning device can be prevented from being adopted as the action policy of the agent even though the environment is in compliance with the learning policy of the (i+1)th learning device. Specifically, even though an action policy is proper in view of the variation behaviors of a part of the state variables, if it is apparently improper in view of the variation behaviors of the other left state variables, it will not be adopted by the agent as an action policy thereof.

Therefore, an action policy defined according to the variation behaviors of the plural state variables can be learned by the agent to execute a task involving complicated actions.

It is acceptable to configure the (i+1)th learning device as to evaluate the (i+1)th reward irrelevant to the value of the ith value gradient function only on an exceptional situation where the ith value gradient function has a positive value.

According to the reinforcement learning system with the mentioned configuration, in a case where the values of the ith value function increase in a time series, in other words, when the environment defined according to the action policy of the agent is in compliance with the learning policy of the ith learning device, the (i+1)th reward is evaluated by the (i+1)th learning device irrelevant to the value of the ith value gradient function as an exception.

Accordingly, the situation where the (i+1)th reward is evaluated excessively high due to the reason that the environment is in compliance with the learning policy of the ith learning device and an action policy contradicted to the learning policy of the (i+1)th learning device is adopted as the action policy for the agent unexpectedly can be avoided. Specifically, such situation can be avoided that the action policy contradicted to the learning policy of a subsequent learning device is adopted due to the reason that the learning result by a previous learning device is excessively emphasized in the learning by the subsequent learning device.

Therefore, an action policy defined according to the variation behaviors of the plural state variables can be learned by the agent to execute a task involving complicated actions.

DETAILED DESCRIPTION OF THE PREFERRED EMBODIMENTS

Hereinafter, an embodiment of a reinforcement learning system according to the present invention will be described in detail with reference to the drawings.

Figure 1:
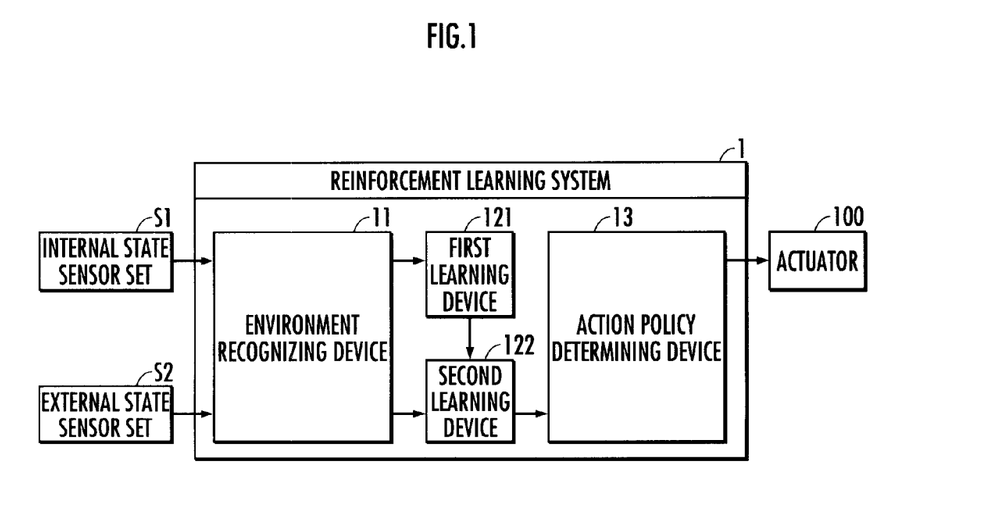
FIG. 1 is a diagram illustrating a configuration of a reinforcement learning system of the present invention.

The configuration of the reinforcement learning system will be firstly described. The reinforcement learning system 1 illustrated in FIG. 1 is composed of an electronic control unit (constituted from a CPU, a ROM, a RAM, an I/O circuit and the like) or a computer. The electronic control unit or the computer is mounted in a robot R illustrated in FIG. 2. The robot R is served as an agent in the present invention.

The CPU of the computer constituting the reinforcement learning system 1 retrieves a reinforcement learning program (software) from memory and performs various processing such as a learning processing (to be described hereinafter) according to the retrieved reinforcement learning program. The reinforcement learning program may be installed in the computer by means of a software recording medium such as CD or DVD, or may be downloaded to the computer through a network or a satellite from a server in a condition when the robot R sends a request signal to the server.

The reinforcement learning system 1 includes an environment recognizing device 11, a first learning device 121, a second learning device 122, and an action policy determining device 13.

The environment recognizing device 11 is configured to recognize a first state variable and a second state variable representing an environment based on output signals from an internal state sensor set S1 and an external state sensor set S2, both of which are mounted in the robot R.

The first learning device 121 is configured to calculate a first reward $r_1(t)$ according to a first reward function $r_1$ based on the first state variable (details of which will be described hereinafter) recognized by the environment recognizing device 11 and a first value $V_1(t)$ according to a first value function $V_1$ based on the first state variable, and thereafter to calculate a first TD error (first error) $\delta_1(t)$ corresponding to the first reward $r_1(t)$ and the first value $V_1(t)$. The first learning device 121 is further configured to modify properly a first value function $V_1$ based on the first error $\delta_1(t)$. The first reward function $r_1$ is defined according to a learning policy which makes a position p of a hand B4 achieve a desired position $p_0$ while keeping down a kinetic energy E thereof.

The second learning device 122 is configured to calculate a second reward $r_2(t)$ based on a value of a second reward function $r_2$ which is related to the second state variable (details of which will be described hereinafter) recognized by the environment recognizing device 11 and a value of a first value gradient function $dV_1/dt$ which is a temporal differential of the first value function $V_1$ and a second value $V_2(t)$ according to a second value function $V_2$ based on the second state variable, and thereafter to calculate a second TD error (second error) $\delta_2(t)$ based on the second reward $r_2(t)$ and the second value $V_2(t)$. The second learning device 122 is further configured to modify properly a second value function $V_2$ based on the second error $\delta_2(t)$. The second reward function $r_2$ is defined according to a learning policy which makes a posture q of a hand B4 achieve a desired posture $q_0$.

The action policy determining device 13 is configured to determine a first output (details of which will be described hereinafter) obtained according to a first output function as a part of an action policy that should be taken by the robot (agent) R based on an environment recognition result from the environment recognizing device 11. Similar to the first value function $V_1$, the first output function is properly modified based on the first error $\delta_1(t)$.

The action policy determining device 13 is configured to determine a second output (details of which will be described hereinafter) obtained according to a second output function as a part of the action policy that should be taken by the robot (agent) R based on the environment recognition result from the environment recognizing device 11. Similar to the second value function $V_2$, the second output function is properly modified based on the second error $\delta_2(t)$. The sum of the first output and the second output is applied to the robot R.

The reinforcement learning system 1 is configured to control actions of the robot R through controlling operations of an actuator 100 according to the action policy determined by the action policy determining device 13.

It should be noted that "a component of the present invention "recognizes" information" means that the component performs a possible information processing on a piece of information to prepare the piece of information ready for other information processing, for example, the component searches the piece of information in a database; retrieves the piece of information from a storing device such as a memory; measures, calculates, estimates, determines the piece of information based on output signals from a sensor or the like; and stores in memory or the like the determined information or the like.

Figure 2:
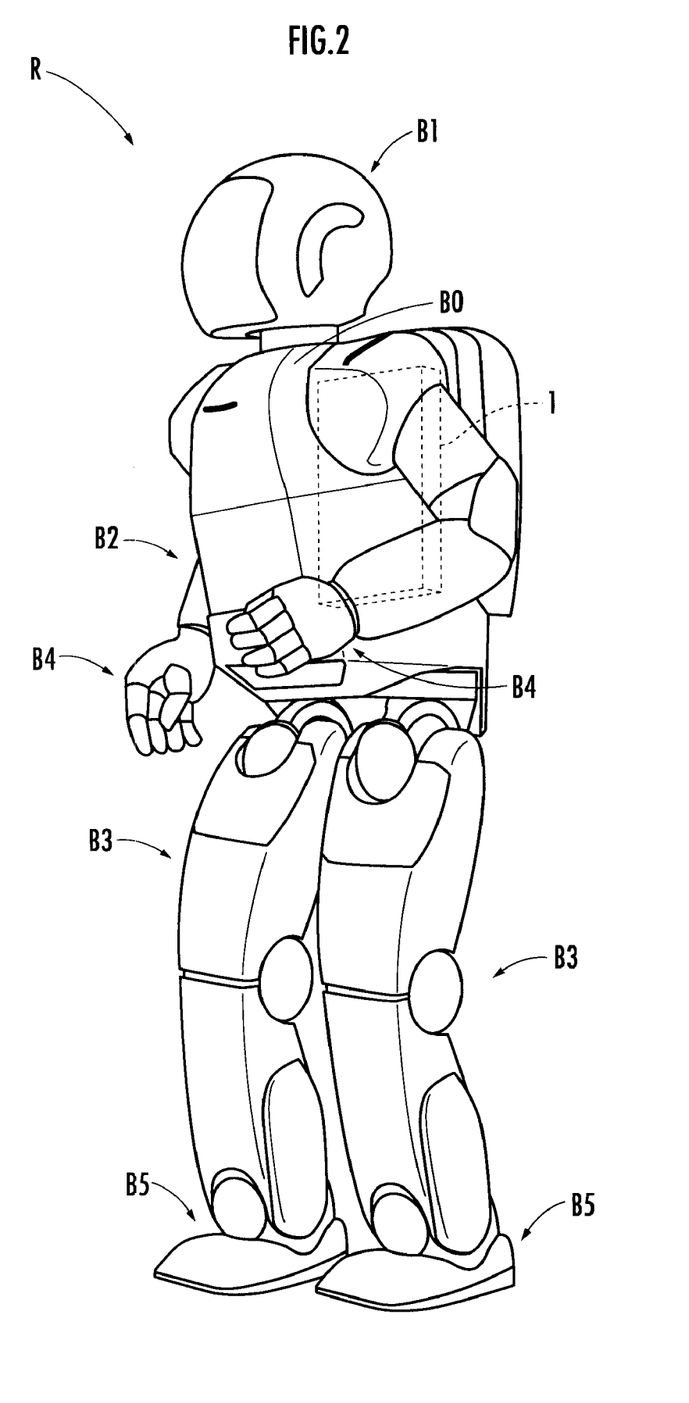
FIG. 2 is a diagram illustrating a configuration of a robot served as an agent.

The robot R is a humanoid robot. Similar to a human being, the robot R is provided with a main body B0, a head B1 disposed at an upper end of the main body B0, a pair of arms B2 extended from an upper portion of the main body B0 to left and right sides, respectively, a hand B4 disposed at an end portion of each arm B2, a pair of left and right legs B3 extended downward from a lower end of the main body B0, and a foot B5 disposed at an end portion of each leg B3.

As disclosed by Japanese Patent Laid-open No. 03/090978 and No. 03/090979 Republished, according to a force transmitted from the actuator, the robot R can stretch and/or bend the arms B2 and legs B3 through a plurality of joint mechanisms corresponding to a plurality of joints of a human being, such as the shoulder joint, the elbow joint, the wrist joint, the hip joint, the knee joint, the ankle joint and the like.

The arm B2 includes a first arm link and a second arm link. The first arm link is connected to the main body B0 via the shoulder joint mechanism. One end of the second arm link is connected to the end portion of the first arm link via the elbow joint mechanism, and the other end thereof is connected to the end portion of the hand B4 via the wrist joint mechanism.

The leg B3 includes a first leg link and a second leg link. The first leg link is connected to the main body B0 via the hip joint mechanism. One end of the second leg link is connected to the end portion of the first leg link via the knee joint mechanism, and the other end thereof is connected to the foot B5 via the ankle joint mechanism.

The robot R can move around autonomously according to iterated movements involving leaving off the floor and stepping on the floor of the left and right legs B3, respectively.

As aforementioned, the robot R is mounted with the internal state sensor set S1 and the external state sensor set S2.

The internal state sensor set S1 includes a GPS determining device or an acceleration sensor for determining a position (position of the center of gravity) of the robot R, a gyro sensor for determining a posture of the main body B0, rotary encoders for determining bending angles and the like of each joint mechanism.

The external state sensor set S2 includes a stereo image sensor, an active distance sensor and the like. The stereo image sensor is mounted in the head B1 and is configured to determine an object, such as a cup, to be held by the robot R. The active distance sensor is mounted in the main body B0 and uses infrared lights to measure the distance actively.

The functions of the reinforcement learning system 1 with the mentioned configurations will be described hereinafter.

Figure 4:
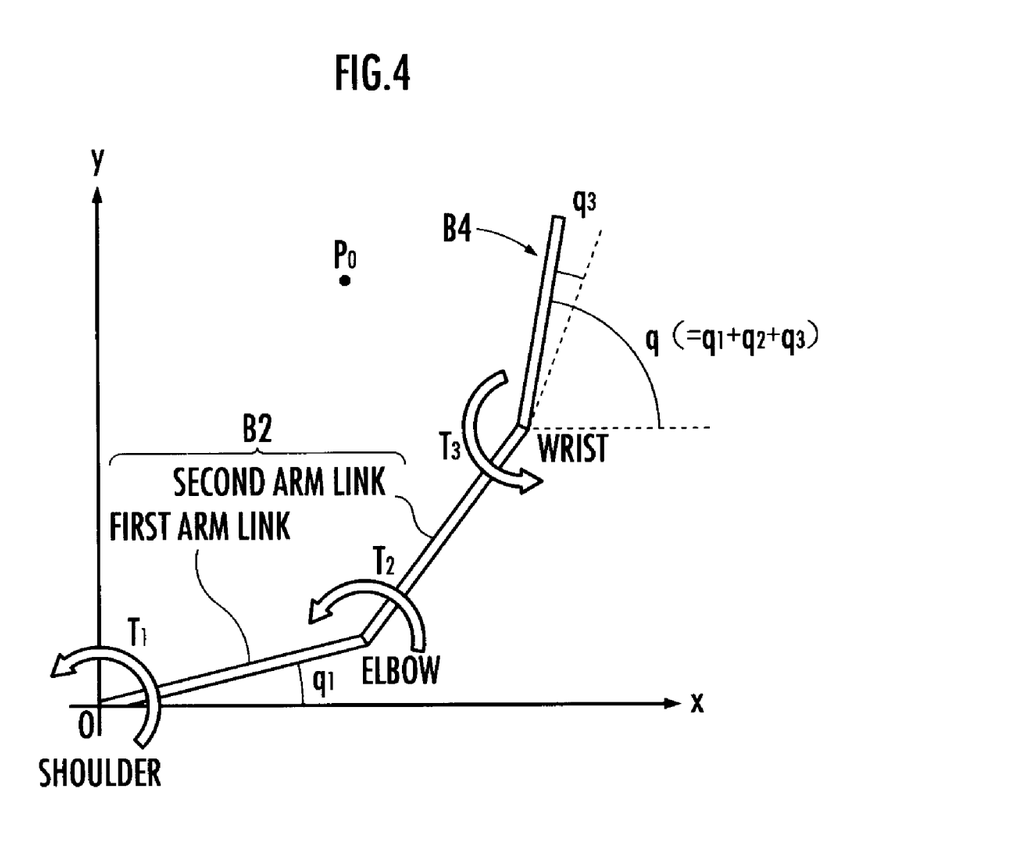
FIG. 4 is an explanatory diagram illustrating a task executed by the agent.

The reinforcement learning system 1 is used to learn the optimum action policy for making the robot R execute a task, for example, to hold an object such as a cup with the hand B4 by moving the arm B2 of a single side. For simple explanation, as illustrated in FIG. 4, the action policy is presumed to be learned at a constraint condition that the movements of the arm B2 and the hand B4 are constrained in a X-Y plane with the position of the shoulder joint as the origin O. The action policy that should be taken by the robot R may be determined according to simulations or experiments with the robot (real product) R used therein.

Figure 3:
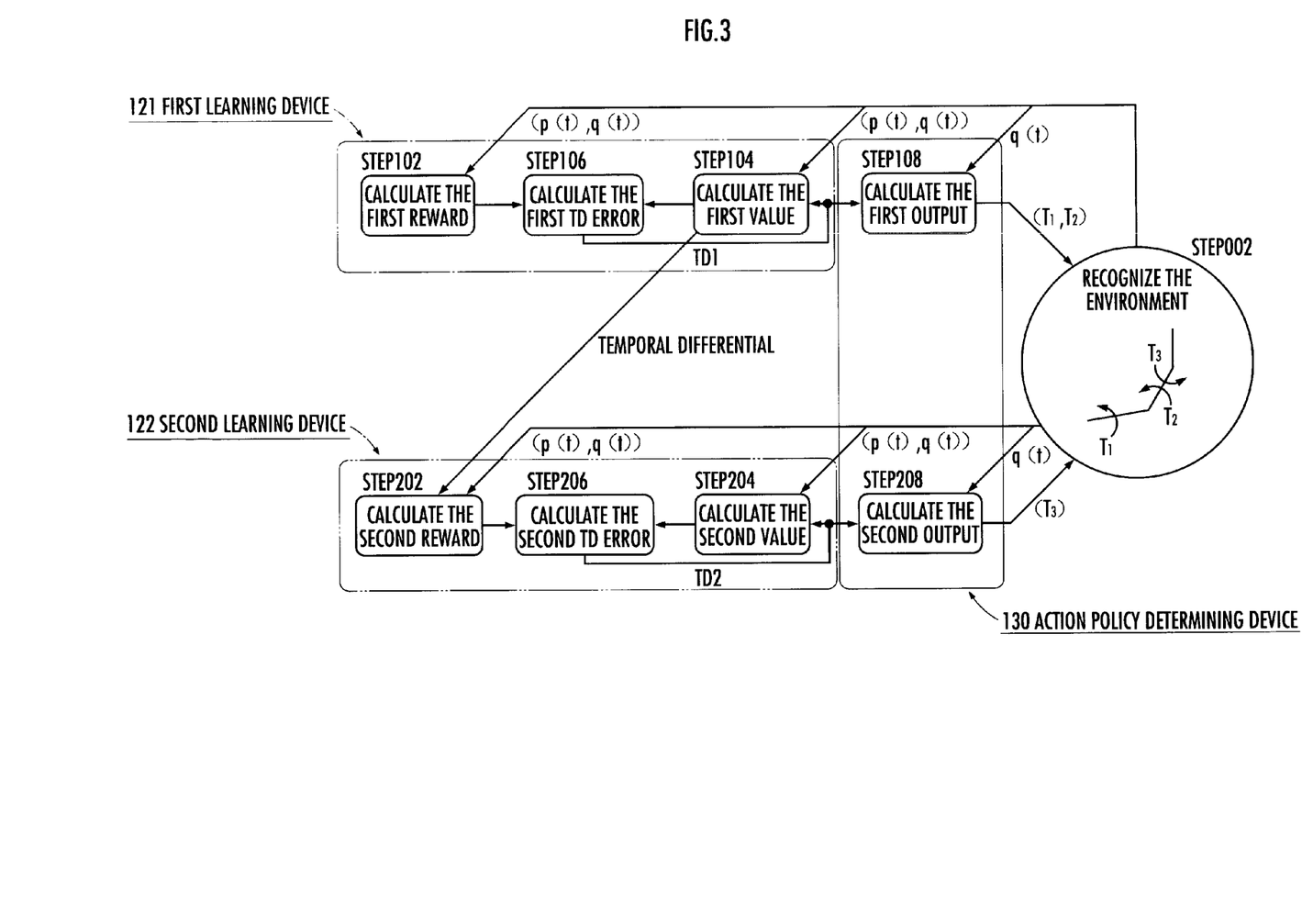
FIG. 3 is a flow chart illustrating an action policy determining method performed by the reinforcement learning system.

First, an environment is recognized by the environment recognizing device 11 (FIG. 3/STEP 002).

Specifically, a two-dimensional position p(t)=(x(t), y(t)) of the hand B4 is recognized as the first state variable, and a posture q(t) of the hand B4 is recognized as the second state variable.

The position p(t) of the hand B4 is determined according to geometrical relationships based on a length L1 of the first arm link, a length L2 of the second arm link, a length L3 of the hand B4, the shoulder joint angle $q_1(t)$, the elbow joint angle $q_2(t)$ and the wrist joint angle $q_3(t)$ (refer to FIG. 4). The data of the lengths L1, L2 and L3 are preliminarily stored in memory.

The shoulder joint angle $q_1(t)$ refers to an angle formed by the first arm link with respect to the frontal plane (x axis) viewed above from the robot R. The elbow joint angle $q_2(t)$ refers to a bending angle of the second arm link with respect to the first arm link viewed above from the robot R. The wrist joint angle $q_3(t)$ refers to a bending angle of the hand B4 with respect to the second arm link viewed above from the robot R.

The posture q(t) of the hand B4 is determined by adding up the shoulder joint angle $q_1(t)$, the elbow joint angle $q_2(t)$ and the wrist joint angle $q_3(t)$ (refer to FIG. 4). The joint angles $q_1(t)$, $q_2(t)$ and $q_3(t)$ can be determined according to output signals from rotary encoders (constituting the internal state sensor set S1) disposed at the shoulder joint, the elbow joint and the wrist joint of the robot, respectively.

The position p(t) of the hand (the end portion) B4 may be determined according to the stereo image sensor (constituting the external state sensor set S2) mounted in the head B1. The consumed electricity E(t) for transiting the hand B4 may be determined according to a data table or a computation equation representing a relationship between the rotation amount and the consumed electricity for each joint actuator based on variation amounts of the joint angles $q_1(t)$, $q_2(t)$ and $q_3(t)$.

The first state variable p(t) and the second state variable q(t) are input to the first learning device 121 and the second learning device 122, respectively. If common information is input, it is possible to compare the information between the first learning device 121 and the second learning device 122. Moreover, the second state variable q(t) is input to the action policy determining device 13.

Subsequently, the first reward $r_1(t)$ is evaluated by the first learning device 121 based on the first state variable p(t) according to the first reward function $r_1$ expressed by the equation (1) (FIG. 3/STEP 102).

$$r_1(t)=\exp(-\alpha_p|p(t)-p_0|^2)-\beta E(t) \quad (1)$$

Figure 5:
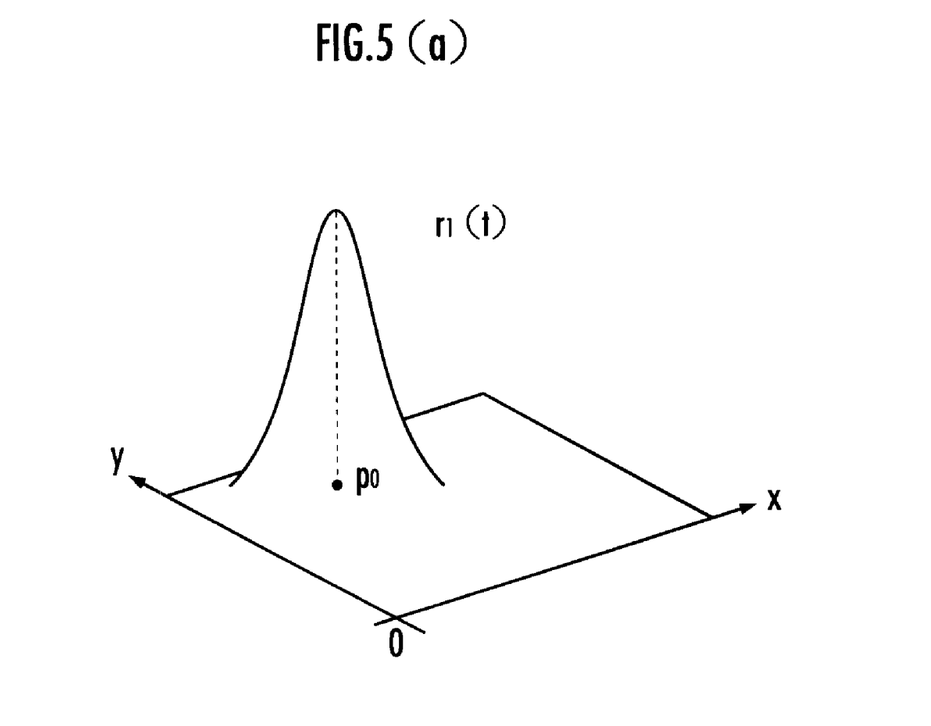
FIG. 5 is an explanatory diagram illustrating different reward functions.

Herein, $p_0$ denotes the desired position of the hand B4, $\alpha_p$ and $\beta$ are positive coefficients. As illustrated in FIG. 5, the first reward function $r_1(t)$ holds a mountain-like shape which has the desired position $p_0$ as the apex and levels down as the position p of the hand B4 moves away from the desired position $p_0$.

As obviously seen from the first term at the right side of the equation (1), the closer the present position p(t) of the hand B4 is to the desired position $p_0$, the higher the first reward $r_1(t)$ is evaluated. As obviously seen from the second term at the right side of the equation (1), the smaller the kinetic energy E(t) is, the higher the first reward $r_1(t)$ is evaluated. The kinetic energy E(t) can be calculated according to a data table or a computation equation representing a relationship between the rotation amount and the kinetic energy of each joint actuator based on variation amounts of the joint angles $q_1(t)$, $q_2(t)$ and $q_3(t)$.

The first value $V_1(t)$ is calculated by the first learning device 121 according to the first value function $V_1$ based on the first state variable p(t) (FIG. 3/STEP 104).

The first value function $V_1$ is determined according to NGNet which actually complies with the thinking of adding a weight to the frequency of occurrence of data based on the first reward function $r_1$ (for example, refer to Reinforcement Learning in Continuous Time and Space, Kenji Doya, Neural Computation, 12(1), 219-245(2000)). It is acceptable to determine the first value function $V_1$ according to a publicly known method different from NGNet, such as RBF, neural network, CMAC or the like.

Then, based on the first reward $r_1(t)$ and the first value $V_1(t)$, the first TD error $\delta_1(t)$ is calculated according to the equation (2) (FIG. 3/STEP 106).

$$\delta_1(t)=r_1(t)+\gamma_1 V_1(t+1)-V_1(t) \quad (2)$$

Herein, $\gamma_1$ represents a discount factor in the Bellman equation adopted by the first learning device 121. The appropriateness of an action policy taken by the robot R previously is evaluated according to the magnitude of the first TD error $\delta_1(t)$. As aforementioned, the first value function $V_1$ and the first output function are properly modified based on the first TD error $\delta_1(t)$. Thus, there is a tendency that the modification amounts thereof become smaller when the action policy taken by the robot R previously is the same as the expected, and on the other hand, the modification amounts thereof become greater when the action policy taken by the robot R previously is different from the expected.

Thereafter, based on the posture (the second state variable) q(t) of the hand B4 which comes as the recognition result of the environment recognizing device 11, the first output is determined as the action policy of the robot R by the action policy determining device 13 according to the first output function (FIG. 3/STEP 108). Specifically, the torque T1 around the shoulder joint and the torque T2 around the elbow joint of the robot R, which make the integrated value of the first reward $r_1(t)$ become maximum, are determined as the first output.

Subsequently, based on the value of the second reward function in accordance with the second state variable q(t) and the value of the first value gradient function (temporal differential of the first value function $V_1$) $dV_1/dt$, the second reward $r_2(t)$ is evaluated according to the equation (3) by the second learning device 122 (FIG. 3/STEP 202).

$$r_2(t) = \exp(-\alpha_q |q(t) - q_0|^2) + \eta n \cdot Y(-x),$$

$$x = dV_1/dt,$$

$$Y(x) \equiv (x \geq 0) \text{ or } 0(x<0) \tag{3}$$

Herein, $q_0$ represent the desired posture of the hand B4, $\alpha_q$ and $\eta$ are positive coefficients.

As illustrated in FIG. 5(*b*), the first term at the right side of the equation (3) holds a mountain-like shape (single peak) which takes the desired posture $q_0$ of the hand B4 as the apex and levels down as the posture q of the hand B4 moves away from the desired posture $q_0$. As obviously seen from the first term at the right side (equivalent to the second reward function native in the second learning device 122) of the equation (3), the closer the present posture q(t) of the hand B4 is to the desired posture $q_0$, the higher the second reward $r_2(t)$ is evaluated.

Figure 6:
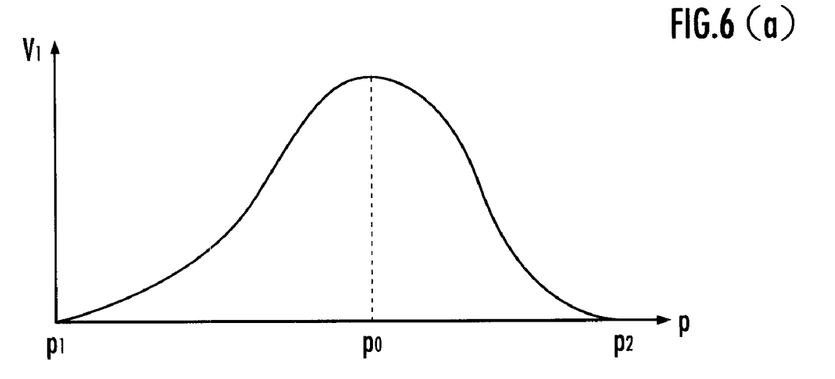
FIG. 6 is an explanatory diagram illustrating a value function and a value gradient function which is a time differential thereof.

In order to examine the significance of the second term at the right side of the equation (3), the situation defined by the first value function $V_1$ as conceptually illustrated in FIG. 6(*a*) has been considered. When the position p of the hand B4 is transited from $p_1$ to $p_2$ as illustrated by a rightward arrow in FIG. 6(*b*), the first value gradient function $dV_1/dt$ is defined to hold a positive value when it is located at the left side of the desired position $p_0$ and to hold a negative value when it is located at the right side of the desired position $p_0$.

Meanwhile, when the position p of the hand B4 is transited from $p_2$ to $p_1$ as illustrated by a leftward arrow in FIG. 6(*c*), the first value gradient function $dV_1/dt$ is defined to hold a negative value when it is located at the left side of the desired position $p_0$ and has a positive value when it is located at the right side of the desired position $p_0$. As obviously seen from the second term at the right side of the equation (3), the greater the value of the first value gradient function $dV_1/dt$ goes negatively, the lower the second reward $r_2(t)$ is evaluated.

Moreover, since the second term at the right side of the equation (3) contains the step function $Y(-x)$, it equals to zero when the first value gradient function $dV_1/dt$ holds a positive value.

Therefore, for example, when the position p(t) of the hand B4 of the robot R is transited in a way represented by the rightward arrow in FIG. 6(*b*), if the position p(t) is located at the left side of the desired position $p_0$ where the first value gradient function $dV_1/dt$ holds a positive value, the second term at the right side of the equation (3) contributes nothing to the evaluation of the second reward $r_2(t)$. On the other hand, if the position p(t) is located at the right side of the desired position $p_0$ where the first value gradient function $dV_1/dt$ holds a negative value, the second term at the right side of the equation (3) contributes to degrading the evaluation of the second reward $r_2(t)$. The contribution degree depends on the magnitude of the first value gradient function $dV_1/dt$ located at the negative side (refer to the length of the downward arrows in FIGS. 6(*b*) and 6(*c*)).

Meanwhile, when the position p (t) of the hand B4 of the robot R is transited in a way represented by the leftward arrow in FIG. 6(*c*), if the position p(t) is located at the right side of the desired position $p_0$ where the first value gradient function $dV_1/dt$ holds a positive value, the second term at the right side of the equation (3) contributes nothing to the evaluation of the second reward $r_2(t)$. On the other hand, if the position p(t) is located at the left side of the desired position $p_0$ where the first value gradient function $dV_1/dt$ holds a negative value, the second term at the right side of the equation (3) contributes to degrading the evaluation of the second reward $r_2(t)$.

Further, the second value $V_2(t)$ is calculated by the second learning device 122 according to the second value function $V_2$ based on the second state variable q(t) (FIG. 3/STEP 204). Similar to the first value function $V_1$, the second value function $V_2$ is also determined according to NGNet which actually complies with the thinking of adding a weight to the frequency of occurrence of data based on the second reward function $r_2$. It is acceptable to determine the second value function $V_2$ according to a publicly known method different from NGNet, such as RBF, neural network, CMAC or the like.

Then, based on the second reward $r_2(t)$ and the second value $V_2(t)$, the second TD error $\delta_2(t)$ is calculated according to the equation (4) (FIG. 3/STEP 206).

$$\delta_2(t) = r_2(t) + \gamma_2 V_2(t+1) - V_2(t) \tag{4}$$

Herein, $\gamma_2$ represents a discount factor in the Bellman equation adopted by the second learning device 122. The appropriateness of an action policy taken by the robot R previously is evaluated according to the magnitude of the second TD error $\delta_2(t)$. As aforementioned, the second value function $V_2$ and the second output function are properly modified based on the second TD error $\delta_2(t)$. Therefore, there is a tendency that the modified amount becomes smaller when the action policy taken by the robot R previously is appropriate and the modified amount becomes greater when the action policy taken by the robot R previously is inappropriate.

Thereafter, the second output is determined as the action policy of the robot R by the action policy determining device 13 according to the second output function based on the posture (the second state variable) q(t) of the hand B4 which comes as the recognition result of the environment recognizing device 11 (FIG. 3/STEP 208). Specifically, the torque T3 around the wrist joint of the robot R, which makes the integrated value of the second reward $r_2(t)$ become maximum is determined as the second output.

Thus, by controlling the operation of the actuator 100 according to the action policy determined by the action policy determining device 13, the action of the robot R, namely the movements of the arm B2 and the hand B4, can be controlled.

Figure 7:
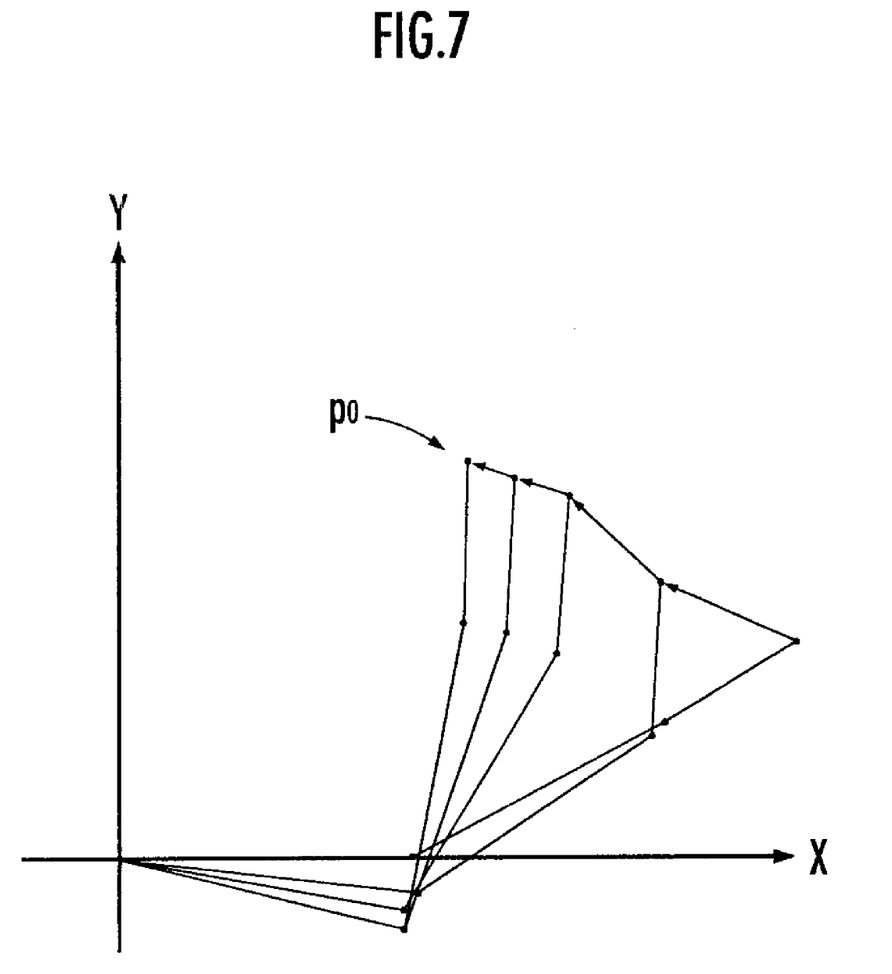
FIG. 7 is an explanatory diagram illustrating a task executed according to a determined action policy.

Specifically, the torque T1 around the shoulder joint and the torque T2 around the elbow joint are controlled according to the first output, and the torque T3 around the wrist joint is controlled according to the second output. Thereby, the action of the robot R is controlled so that the position p(t) of the hand B4 and the posture q(t) thereof vary in a way as illustrated in FIG. 7 by arrows.

According to the reinforcement learning system 1 which exhibits the above-mentioned functions, the value of the first value gradient function $dV_1/dt$ can be utilized in the learning, in other words, in the evaluation of the second reward $r_2(t)$ by the second learning device 122. Herein, the first value gradient function $dV_1/dt$ is a temporal differential of the first value function $V_1$ which is defined according to the first reward $r_1(t)$ obtained from the environment and is also a learning result obtained by the first learning device 121 (refer to FIG. 3/STEP 122 and the equation (2)). The variation behavior of the environment satisfying a condition that the integrated value of the second reward $r_2(t)$ is the maximum is determined as the action policy which should be taken by the robot R to execute a task (refer to FIG. 3/STEP 130 and FIG. 7).

Specifically, in a case where the first value function $V_1(t)$ decrease in a time series ($dV_1(t)/dt<0$), in other words, when the environment defined according to the action policy of the robot R is contradicted to the learning policy of the first learning device 121, the second reward $r_2(t)$ calculated by the second learning device 122 is evaluated lower (refer to the second term at the right side of the equation (3)).

Accordingly, an action policy which is contradicted to the learning policy (which makes the position p of the hand B4 achieve the desired position $p_0$ while keeping down the kinetic energy E thereof) of the first learning device 121 can be prevented from being adopted as the action policy of the robot R even though the environment is in compliance with the learning policy (which makes the posture q of the hand B4 achieve the desired posture $q_0$) of the second learning device 122. Specifically, even though an action policy is proper in making the posture q of the hand B4 achieve the desired posture $q_0$, if it is apparently improper in making the position p of the hand B4 achieve the desired position $p_0$ while keeping down the kinetic energy E thereof, the action policy will be prevented from being adopted as an action policy of the robot R.

Moreover, in a case where the values of the first value function $V_1(t)$ increase in a time series ($dV_1(t)/dt>0$), in other words, when the environment defined according to the action policy (the position p(t) of the hand B4) of the robot R is in compliance with the learning policy of the first learning device 121, the second reward $r_2(t)$ is evaluated by the second learning device 122 irrelevant to the value of the first value gradient function $dV_1(t)/dt$ as an exception (refer to the step function Y of the second term at the right side of the equation (3)).

Accordingly, the situation where the second reward $r_2(t)$ is evaluated excessively high due to the reason that the environment is in compliance with the learning policy of the first learning device 121 and an action policy contradicted to the learning policy of the second learning device 122 is adopted as the action policy for the robot R unexpectedly can be avoided. Specifically, even though an action policy is proper in making the position p of the hand B4 achieve the desired position $p_0$ while keeping down the kinetic energy E thereof, if it is apparently improper in making the posture q of the hand B4 achieve the desired posture $q_0$, the action policy will be prevented from being adopted as an action policy of the robot R.

Therefore, the most proper action policy defined according to the variation behaviors of a plurality of state variables can be learned by the robot R to execute a task such as holding an object which involves complicated actions of the arm B2 and the hand B4.

It is acceptable to define the first learning device 121 according to the learning policy which makes the posture q of the hand B4 achieve the desired posture $q_0$ and the second learning device 122 according to the learning policy which makes the position p of the hand B4 achieve the desired position $p_0$ which keeping down the kinetic energy E thereof in an opposite way to that described in the above embodiment.

In this case, similar to the above embodiment, by calculating the first reward $r_1(t)$ according to the equation (5) and the second reward $r_2(t)$ according to the equation (6), the most proper action policy can be learned by the robot R to execute a task such as holding an object which involves complicated actions of the arm B2 and the hand B4 which are defined by the variation behaviors of a plurality of the state variables.

$$r_1(t)=\exp(-\alpha_q|q(t)-q_0|^2) \quad (5)$$

$$r_2(t)=\exp(-\alpha_p|p(t)-p_0|^2)=\beta E(t)+\eta x \cdot Y(-x),$$

$$x=dV_1(t)/dt \quad (6)$$

Also, it is acceptable for the reinforcement learning system 1 to have 3 or even more learning devices. For example, in addition to the first learning device 121 and the second Learning device 122, a third learning device may be included therein to evaluate a third reward $r_3(t)$ based on a second value gradient function $dV_2/dt$ which is a temporal differential of the second value function $V_2$ of the second learning device 122, and a part or the entire part of an action policy may be determined based on an output from the third learning device.

Thus, the learning result by the second learning device 122 can be fully utilized directly and the learning result by the first learning device 121 can be fully utilized indirectly in the learning by the third learning device. Specifically, the third reward $r_3(t)$ served as the learning result by the third learning device reflects all the learning policies represented by the first reward function $r_1$ of the first learning device 121 and the second reward function $r_2$ of the second learning device 122, respectively.

Thereby, the action policy defined according to the variation behaviors of the plurality of state variables can be learned by the robot R to execute a task involving complicated actions. Similar to the first value function $V_1$, it is also acceptable to determine the (i+1)th value function $V_{i+1}$ (i=1, 2, ...) according to a publicly known method such as NGNet, RBF, neural network, CMAC or the like.

In the above-mentioned embodiment, the action policy is learned by the robot R to execute a task. However, it is also acceptable that the action policy is learned by a human being served as the agent to execute such a task as to produce a piece of article, to move to a destination location, or to wear clothes.

In the above-mentioned embodiment, the first output (the torque T1 around the shoulder joint and the torque T2 around the elbow joint) is determined as a part of the action policy of the robot R according to the first output function, and the second output (the torque T3 around the wrist joint) is determined as the left part of the action policy of the robot R according to the second output function. However, it is also acceptable that the torques T1, T2 and T3 around the respective joints are determined as the action policy of the robot R according to the second output function based on the first output determined according to the first output function and the recognition result by the environment recognizing device 11.

What is claimed is:

1. A reinforcement learning system for making an agent learn an action policy for executing a task, the reinforcement learning system is a computer including a processing unit which reads software from a memory, and the reinforcement learning system comprises:
an environment recognizing device configured to recognize a first to an nth (n≧2) state variables representing an environment;
n numbers of jth (j=1, 2, ... n) learning devices, each jth learning device configured to calculate a jth reward based on a jth state variable recognized by the environment recognizing device, calculate a jth value according to a jth value function based on the jth state variable, calculate a jth error based on the jth reward and the jth value, and properly modify respectively the jth value function based on the jth error; and
an action policy determining device configured to determine an action policy the agent should take based on each jth reward calculated by each jth learning device,
wherein each (i+1)th (i=1, 2, ... n−1) learning device is configured to calculate an (i+1)th reward based on a value of an ith reward function related to an ith state variable and a value of an ith value gradient function which is a temporal differential of an ith value function.

2. The reinforcement learning system according to claim 1, wherein the (i+1)th learning device is configured to evaluate the (i+1)th reward lower as the ith value gradient function goes greater toward a negative side.

3. The reinforcement learning system according to claim 1, wherein the agent is a robot.

4. The reinforcement learning system according to claim 1, further comprising an electronic control unit which includes the environment recognizing device, the n numbers of jth (j=1, 2, . . . n) learning devices, and the action policy determining device.

5. The reinforcement learning system according to claim 1, wherein each of the n numbers of jth learning devices is configured to calculate a jth output based on the jth error, and
wherein the action policy determining device is configured to determine the action policy the agent should take to include each of the jth outputs.

6. A reinforcement learning system for making an agent learn an action policy for executing a task, the reinforcement learning system is a computer including a processing unit which reads software from a memory, and the reinforcement learning system comprises:
an environment recognizing device configured to recognize a first to an nth (n≧2) state variables representing an environment;
n numbers of jth (j=1, 2, . . . n) learning devices configured to calculate a jth reward based on a jth state variable recognized by the environment recognizing device, calculate a jth value according to a jth value function based on the jth state variable, calculate a jth error based on the jth reward and the jth value, and properly modify respectively the jth value function based on the jth error; and
an action policy determining device configured to determine an action policy the agent should take based on a part or the entire part of the jth reward calculated by the n numbers of the jth learning device,
wherein an (i+1)th (i=1, 2, . . . n−1) learning device is configured to calculate an (i+1)th reward based on a value of an ith reward function related to an ith state variable and a value of an ith value gradient function which is a temporal differential of an ith value function, wherein the (i+1)th learning device is configured to evaluate the (i+1)th reward lower as the ith value gradient function goes greater toward a negative side, and wherein the (i+1)th learning device is configured to evaluate the (i+1)th reward irrelevant to the value of the ith value gradient function only on an exceptional situation where the ith value gradient function has a positive value.

7. A robot comprising a reinforcement learning system for making the robot learn an action policy for executing a task, the reinforcement learning system mounted in the robot and comprising:
an environment recognizing device configured to recognize a first to an nth (n≧2) state variables representing an environment;
n numbers of jth (j=1, 2, . . . n) learning devices, each jth learning device configured to calculate a jth reward based on a jth state variable recognized by the environment recognizing device, calculate a jth value according to a jth value function based on the jth state variable, calculate a jth error based on the jth reward and the jth value, properly modify respectively the jth value function based on the jth error, and calculate a jth output based on the jth error; and
an action policy determining device configured to determine an action policy the agent should take based on each jth reward calculated by each jth learning device so that the determined action policy includes each of the jth outputs calculated,
wherein each (i+1)th (i=1, 2, . . . n−1) learning device is configured to calculate an (i+1)th reward based on a value of an ith reward function related to an ith state variable and a value of an ith value gradient function which is a temporal differential of an ith value function.

8. The robot according to claim 7, wherein the (i+1)th learning device is configured to evaluate the (i+1)th reward lower as the ith value gradient function goes greater toward a negative side.

9. The robot according to claim 7, wherein the (i+1)th learning device is configured to evaluate the (i+1)th reward irrelevant to the value of the ith value gradient function only on an exceptional situation where the ith value gradient function has a positive value.

10. The robot according to claim 7, further comprising an electronic control unit which includes the environment recognizing device, the n numbers of jth (j=1, 2, . . . n) learning devices, and the action policy determining device.

11. The robot according to claim 7, further comprising a plurality of body parts, wherein the action policy determining device is configured to determine an action policy the agent should take such that each of the plurality of body parts moves according to a unique one of the jth outputs.

12. The robot according to claim 11, wherein the first to the nth state variables relate to a position and posture of the plurality of body parts of the robot.

\* \* \* \* \*